United States Patent
Orenstien et al.

(10) Patent No.: US 7,114,038 B2
(45) Date of Patent: Sep. 26, 2006

(54) METHOD AND APPARATUS FOR COMMUNICATING BETWEEN INTEGRATED CIRCUITS IN A LOW POWER MODE

(75) Inventors: Doron Orenstien, Haifa (IL); Marcelo Yuffe, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/040,608

(22) Filed: Dec. 28, 2001

(65) Prior Publication Data

US 2003/0126377 A1 Jul. 3, 2003

(51) Int. Cl.
*G06F 13/00* (2006.01)

(52) U.S. Cl. .................. 711/146; 711/154; 710/107; 713/320

(58) Field of Classification Search .............. 711/100, 711/118, 141, 146, 154, 107; 710/300, 107; 713/320, 323, 300

See application file for complete search history.

(56) References Cited

U.S. PATENT DOCUMENTS

| | | | | |
|---|---|---|---|---|
| 5,369,753 A | * | 11/1994 | Tipley | 711/122 |
| 5,659,514 A | * | 8/1997 | Hazani | 365/218 |
| 5,745,730 A | * | 4/1998 | Nozue et al. | 711/135 |
| 5,745,732 A | * | 4/1998 | Cherukuri et al. | 711/168 |
| 5,796,977 A | * | 8/1998 | Sarangdhar et al. | 710/305 |
| 5,813,022 A | * | 9/1998 | Ramsey et al. | 711/3 |
| 5,949,775 A | * | 9/1999 | Rautiola et al. | 370/338 |
| 6,014,717 A | * | 1/2000 | Bezzant et al. | 710/22 |
| 6,052,754 A | * | 4/2000 | Anand | 710/305 |
| 6,085,274 A | * | 7/2000 | Seeman | 710/310 |
| 6,085,330 A | * | 7/2000 | Hewitt et al. | 713/322 |
| 6,480,965 B1 | * | 11/2002 | Harriman et al. | 713/322 |
| 6,581,124 B1 | * | 6/2003 | Anand | 710/305 |
| 6,631,474 B1 | * | 10/2003 | Cai et al. | 713/300 |
| 6,636,939 B1 | * | 10/2003 | George | 711/111 |

* cited by examiner

*Primary Examiner*—Tuan V. Thai
(74) *Attorney, Agent, or Firm*—Blakely, Sokoloff, Taylor & Zafman LLP

(57) ABSTRACT

For one embodiment, a computer system includes both high power and low power buses coupling a processor to a controller. When the processor is in a high power mode, its cache is snooped by the controller via the high power bus. When the processor is in a low power mode, its cache is snooped by the controller via the low power bus.

11 Claims, 3 Drawing Sheets

METHOD AND APPARATUS FOR COMMUNICATING BETWEEN INTEGRATED CIRCUITS IN A LOW POWER MODE

The present invention relates to computer systems and more particularly to enabling communication between two integrated circuits, including, for example, a processor and a controller, using high and low power buses.

BACKGROUND

Computer systems are becoming increasingly pervasive in our society, including everything from small handheld electronic devices, such as personal data assistants and cellular phones, to application-specific electronic components, such as set-top boxes and other consumer electronics, to medium-sized mobile and desktop systems to large workstations and servers. Computer systems typically include one or more processors. A processor manipulates and controls the flow of data in a computer by executing instructions. To provide more powerful computer systems for consumers, processor designers strive to continually increase the operating speed of the processor. Unfortunately, as processor speed increases, the power consumed by the processor tends to increase as well. Historically, the power consumed by a computer system has been limited by two factors. First, as power consumption increases, the computer tends to run hotter, leading to thermal dissipation problems. Second, the power consumed by a computer system may tax the limits of the power supply used to keep the system operational, reducing battery life in mobile systems and diminishing reliability while increasing cost in larger systems.

One way to reduce the power consumed by the processor is to enable the processor to operate in different power states or modes. Generally, when a processor is in a high power mode, the processor consumes more power than when the processor is in a low power mode. Therefore, increasing the relative amount of time a processor spends in a low power mode reduces the overall power consumed by the computer system.

Unfortunately, some low power modes do not support snooping of one or more caches of a processor. This may limit the usefulness of the low power mode and force the processor to spend more time in a high power mode, increasing power consumption of the computer system. The present invention addresses this and other problems associated with the prior art.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, a processor may operate in at least two different modes, a high power mode and a low power mode. While in the high power mode, the processor may communicate with a controller via a high power bus. When a peripheral device performs a memory access, the address of that access may be provided by the controller to the processor via the high power bus to snoop processor's cache.

When the processor transitions into a low power mode, the high power bus may be powered down, thereby reducing power consumption of the processor. During this low power mode, when a peripheral device performs a memory access, the address of that access may be provided by the controller to the processor via a low power bus to snoop the processor's cache. Enabling snooping of the processor's cache via the low power bus while the processor is in a low power mode reduces the need for the processor to transition back to the high power mode to service the snoop. Thus, power consumption is reduced.

A more detailed description of embodiments of the present invention, including various configurations and implementations, is provided below.

As used herein, the terms "high power" and "low power" are relative indications of the power state of a device. A device in a high power mode may generally consume more power, on average, than the same device in a low power mode. High power modes may alternately be referred to as wake states, execution states, processing states, etc. Low power modes may alternately be referred to as sleep states, idle states, power-down states, etc.

Figure 1:
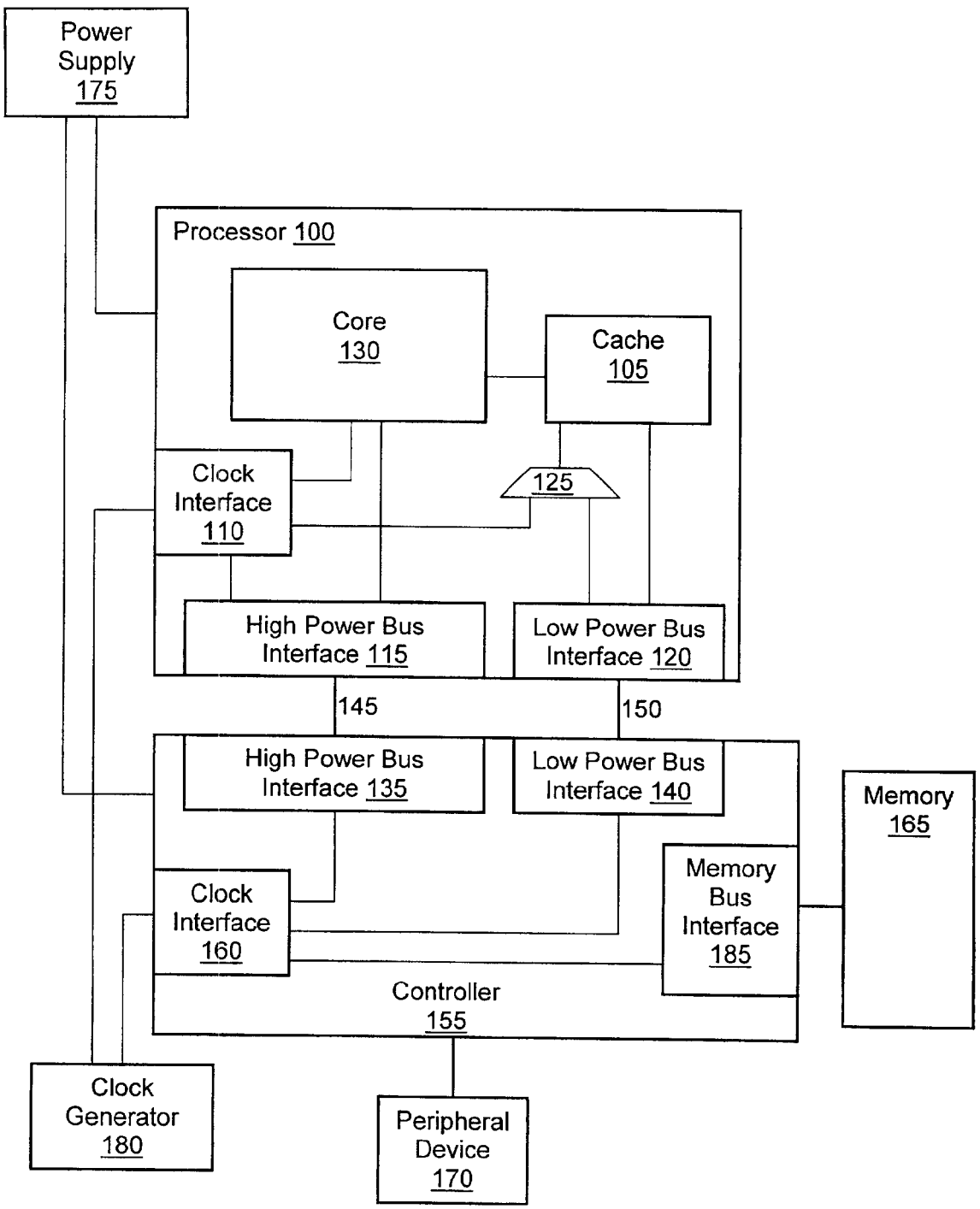
FIG. 1 includes a computer system formed in accordance with an embodiment of the present invention.

FIG. 1 includes a computer system formed in accordance with an embodiment of the present invention. Power supply 175 supplies a voltage to processor 100 and to controller 155. Processor 100 includes clock interface 110 that receives a clock signal from clock generator 180 via one or more clock signal lines, and clock interface 110 distributes the clock signal internally to various components within processor 100. For example, clock interface 110 may distribute the clock signal to the processor core 130, to cache 105 (via multiplexer 125) and to high power bus interface 115. Clock interface 110 may include one or more phase-locked loops (PLLS) to condition the incoming clock signal from clock generator 180. In addition, one or more PLLs within clock interface 110 may increase (multiply) or decrease (divide) the frequency of the incoming clock signal from clock generator 180 before providing the clock signal to other components of processor 100. Clock interface 110 may provide the clock signal at different frequencies to different components of processor 100.

Core 130 of processor 100 of FIG. 1 may include, for example, one or more execution units and registers to execute instructions. Core 130 receives its clock signal from clock generator 180 via a clock signal line to clock interface 110 of processor 100. Core 130 is coupled to cache 105 to store and access data. Core 130 is further coupled to high power bus interface 115 of processor 100 through which processor 110 may communicate with controller 155. High power bus interface 115 may also receives its clock signal from clock generator 180 via a clock signal line to clock interface 110 of processor 100.

Note that although only a single cache is shown in processor 100 of FIG. 1, processor 100 may include additional caches. For example, processor 100 may include separate L0, L1, and L2 caches, etc. During a high power mode of operation (to be described in more detail below), cache 105 may receive its clock signal from clock generator 180 via a clock signal line to clock interface 110, routed through multiplexer 125. During a low power mode of operation (to be described in more detail below), cache 105 may receive its clock signal from clock generator 180 via a clock signal line to clock interface 160 of controller 155, provided to the low power bus interface 120 of processor 100 via low power bus 150, and routed through multiplexer 125. Cache 105 is further coupled to low power bus interface 120 to support access of cache 105 during a low power mode of operation (to be described in more detail below).

Controller 155 of FIG. 1 includes clock interface 160 that receives a clock signal from clock generator 180 via one or more clock signal lines, and clock interface 160 distributes the clock signal internally to various components within controller 155. For example, clock interface 160 may distribute the clock signal to high power bus interface 135, to low power bus interface 140, and to memory bus interface 185 of controller 155. Clock interface 160, like clock interface 110, may include one or more phase-locked loops (PLLs) to condition the incoming clock signal from clock generator 180. In addition, one or more PLLs within clock interface 160 may increase or decrease the frequency of the incoming clock signal from clock generator 180 before providing the clock signal to other components of controller 155. Clock interface 160 may provide the clock signal at different frequencies to different components of controller 155.

The clock signal may be provided to high power bus interface 115 and to high power bus interface 135 to synchronize the communication between controller 155 and processor 100 via high power bus 145 of FIG. 1. In accordance with some embodiments of the present invention, high power bus 145 may alternately be referred to as a front side bus, a processor bus, a primary bus, or a system bus. The clock signal may also be provided to low power bus interface 140 to synchronize the communication between controller 155 and processor 100 via low power bus 150. Low power bus interfaces 120 and 140, along with low power bus 150, are described in more detail below in conjunction with FIG. 2.

In accordance with one embodiment of the present invention, high power bus 145 is wider than low power bus 150, allowing high power bus 145 to communicate more bits per clock cycle than low power bus 150 of FIG. 1. Because low power bus 150 may be narrower than high power bus 145, low power bus 150 may operate serially in comparison to high power bus 145 which may operate in a more parallel manner. In addition, in accordance with one embodiment of the present invention, high power bus 145 may consume more power, on average, than low power bus 150. In other words, in accordance with this embodiment of the present invention, high power bus interfaces 115 and 135 may consume more power, on average, when communicating via high power bus 145 than low power bus interfaces 120 and 140 may consume when communicating via low power bus 150.

In accordance with these and other embodiments of the present invention, high power bus 145 may communicate at a higher clock frequency than low power bus 150. In accordance with one embodiment of the present invention, low power bus 150 may operate as a source-synchronous bus, synchronized to a clock signal from controller 155. For one embodiment, high power bus 145 may lack support for source-synchronous operation. For this embodiment, high power bus interface 115 may be synchronized to high power bus interface 135, for communication via high power bus 145, via separate clock signals from clock interfaces 110 and 160, respectively.

Controller 155 of FIG. 1 is additionally coupled to memory 165 and to peripheral device 170. Note that in accordance with some computer architectures, peripheral device 170 may be coupled to controller 155 via one or more additional bus interfaces, bus-to-bus bridges, hubs, or other controllers. In accordance with an embodiment of the present invention, peripheral device 170 may be a device having bus mastering capability with read or write access to memory 165 via controller 155. In accordance with an embodiment of the present invention, peripheral device 170 may be a magnetic storage device such as a hard drive, an optical storage device such as a digital video disc (DVD) drive, an audio device, a video device such as a graphics device, other user input/output device, a network interface, wireless communications port, etc. In accordance with one embodiment of the present invention, memory 165 may be the main memory of a computer system.

In accordance with one embodiment of the present invention, controller 155 of FIG. 1 may represent a single or multiple hubs or bridges to allow devices of different bus architectures to communicate with each other. For example, controller 155 may be a memory controller hub. In accordance with one embodiment of the present invention, controller 155 may be referred to as a north bridge. In addition, controller 155 may be implemented as a single integrated circuit or distributed across multiple integrated circuits.

Similarly, processor 100 of FIG. 1 may be implemented as a single integrated circuit or distributed across multiple integrated circuits. For example, for one embodiment of the present invention, all or a portion of cache 105 may reside in a separate integrated circuit, external to processor 100. In addition, in accordance with an alternate embodiment of the present invention, additional processors or controllers may be coupled to high power bus 145 and to low power bus 150, each having high and low power bus interfaces. An embodiment of the present invention may be implemented on integrated circuits other than processor 100 and controller 155. For example, an embodiment of the present invention may be implemented by and between two controllers, such as a hub and a graphics controller, or by and between two processors.

In accordance with one embodiment of the present invention, to eliminate some circuit redundancy and pin count, low power bus 150 may be, at least in part, a subset of high power bus 145 of FIG. 1. In other words, some or all of the signal lines of low power bus 150 may double as signal lines of high power bus 145. In accordance with this embodiment, some or all of the circuitry of low power bus interfaces 120 and 140 may be subsumed within high power bus interfaces 115 and 135, respectively.

Figure 2:
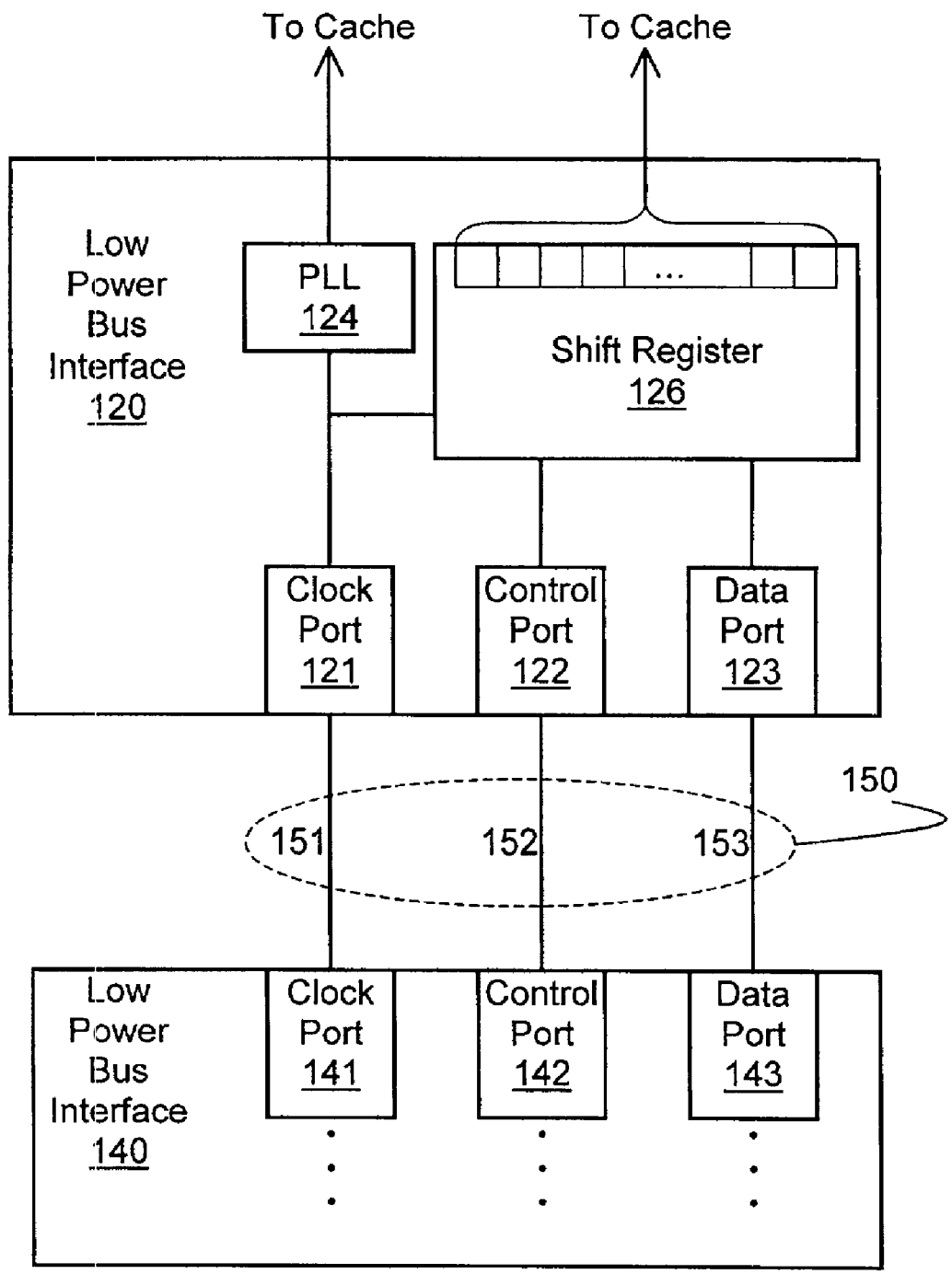
FIG. 2 includes circuits formed in accordance with an embodiment of the present invention.

FIG. 2 provides a more detailed look at low power bus interfaces 120 and 140 of FIG. 1, as well as low power bus 150. As shown, in accordance with one embodiment of the present invention, low power bus 150 may include a clock signal line 151, a control signal line 152, and a data line 153. Clock port 121 of low power bus interface 120 is coupled to clock port 141 of low power bus interface 140 via clock signal line 151. Control port 122 of low power bus interface 120 is coupled to control port 142 of low power bus interface 140 via control signal line 152. Data port 123 of low power bus interface 120 is coupled to data port 143 of low power bus interface 140 via data line 153.

In accordance with one embodiment of the present invention, during operation of low power bus 150 of FIG. 2, a clock signal may be sent from clock port 141 of low power bus interface 140 of controller 155 to clock port 121 of low power bus interface 120 of processor 100. This clock signal may be used to synchronize the transfer of data transferred between low power bus interfaces 120 and 140 across low power bus 150. The clock signal originates at clock generator 180, is provided to clock interface 160 of controller 155 via a clock signal line, and clock interface 160 then provides the clock signal to low power bus interface 140. The clock signal is provided to PLL 124 from clock port 121 of low power bus interface 120. PLL 124 may increase or decrease the frequency of this clock signal before sending the signal on to the cache of processor 100. In addition, the clock signal is provided to shift register 126 to time the operation of the shift register.

Note that in accordance with an alternate embodiment of the present invention, the clock signal may be increased or decreased by a PLL before being provided to the shift register. Alternatively, the clock signal may be sent at the same frequency at which it is received via clock signal line 151 of low power bus 150 of FIG. 2. For one embodiment of the present invention, low power bus interface 140 may also include one or more PLLs to increase or decrease the frequency of the clock signal received from clock interface 160 before providing the clock signal to processor 100 via clock signal line 151 of low power bus 150.

During operation of low power bus 150 of FIG. 2, a control signal may be sent between control port 142 of low power bus interface 140 and control port 122 of low power bus Interface 120. This control signal may be used to synchronize streams of data transferred between low power bus interfaces 120 and 140 across low power bus 150. The control signal may be provided to shift register 126 from control port 122.

In accordance with one embodiment of the present invention, during operation of low power bus 150 of FIG. 2, data may be sent between data port 143 of low power bus interface 140 and data port 123 of low power bus interface 120. In accordance with one embodiment of the present invention, data line 153 may be one of two or more data lines of low power bus 150. For another embodiment of the present invention, data line 153 is the only data line of low power bus 150. For this embodiment, low power bus 150 may be a three wire bus, including clock signal line 151, control signal line 152, and data line 153. Data may be provided to shift register 126 from data port 123.

In accordance with one embodiment of the present invention, data may be serialized by low power bus interface 140 before being transferred to low power bus interface 120 via low power bus 150 of FIG. 2. In accordance with one embodiment of the present invention, this data may be serialized by a shift register or multiplexer (not shown) of low power bus interface 140. To convert the serialized data back to its original width, or to a width that may be useful for internal routing by processor 100, shift register 126 may be used to reassemble data. Alternatively, a demultiplexer may be used to reassemble the data to the desired width.

Similarly, In accordance with one embodiment of the present invention, data may be serialized by low power bus interface 120 before being transferred to low power bus interface 140 via low power bus 150 of FIG. 2. In accordance with one embodiment of the present invention, this data may be serialized by a shift register or multiplexer (not shown) of low power bus interface 120. To convert the serialized data back to its original width, or to a width that may be useful for routing by controller 155, a shift register or demultiplexer (not shown) within low power bus interface 140 may be used to reassemble data.

Figure 3:
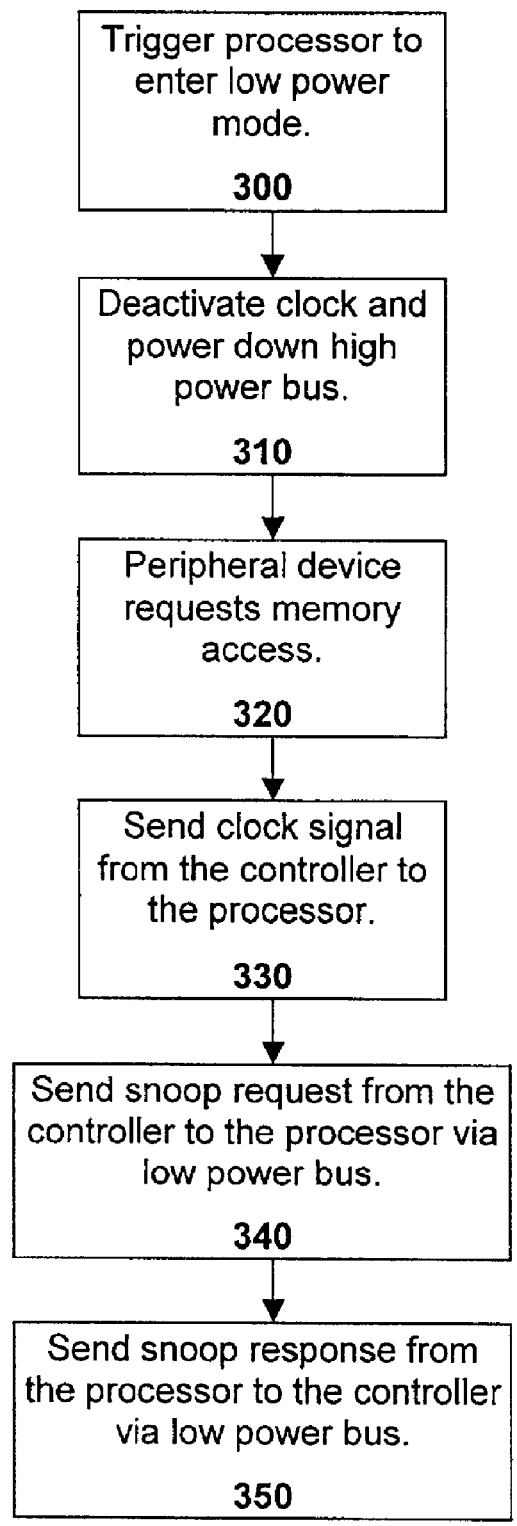
FIG. 3 includes a flow chart showing a method of the present invention.

FIG. 3 includes a flow chart showing a method of the present invention and will be described below in conjunction with the FIGS. 1 and 2, described above. At step 300, processor 100 is triggered to enter a low power mode. This trigger may be a signal sent to the processor from an external device. Alternatively, the trigger may be a signal generated internal to the processor in response to executing a particular instruction.

At step 310 of FIG. 3, a clock is deactivated and the high power bus is powered down, placing the processor in a low power mode. In accordance with one embodiment of the present invention, the clock deactivated at step 310 may include stopping one or more clock signals emanating from clock interface 110 to one or more other components of processor 100. These other components may include, for example, processor core 130, cache 105, and high power bus interface 115. For one embodiment of the present invention, the clock signal sent from clock generator 180 to processor 100 is stopped. In addition to deactivating one or more clock signals and the high power bus, in accordance with one embodiment of the present invention, one or more caches of processor 100 may be flushed. For example, an L1 cache may be flushed to an L2 cache. Alternatively, an L0 cache may be flushed to an L1, or both L0 and L1 caches may be flushed to an L2 cache.

In accordance with one embodiment of the present invention, powering down high power bus 145 at step 310 may include not only stopping the clock provided to high power bus interface 115 from clock interface 110 of processor 100 but also stopping the clock provided to high power bus interface 135 from clock interface 160 of controller 155. In addition, in accordance with one embodiment of the present invention, powering down high power bus 145 at step 310 may include turning off sense amps, input/output buffers, voltage clamps and other power consuming devices within high power bus interfaces 115 and 135.

In accordance with one embodiment of the present invention, cache 105 of FIG. 1, which is normally accessible via high power bus 145 when processor 100 is in a high power mode, is inaccessible via high power bus 145 when processor 100 is in a low power mode. In particular, snooping cache 105, which is normally supported via high power bus 145 when processor 100 is in a high power mode, is not supported via high power bus 145 when processor 100 is in a low power mode.

At step 320, peripheral device 170 requests an access of memory 165 via controller 155. This access may be, for example, a memory read or write. In accordance with one embodiment of the present invention, to maintain coherency with cache 105 of processor 100, controller 155 snoops cache 105 without requiring processor 100 to re-enter a high power mode, as described in steps 330–350 below.

At step 330, a clock signal may be sent from controller 155 to processor 100 via clock signal line 151 of low power bus 150. This clock signal may be provided to cache 105 via multiplexer 125 to provide access to cache 105. Thus access to cache 105 may be enabled notwithstanding the fact that the normal clock signal from clock interface 110 to cache 105 may be stopped while processor 100 is in a low power mode.

In accordance with one embodiment of the present invention, the clock signal provided to cache 105 via low power bus interface 120 during the low power mode of operation may be a different frequency than the clock signal provided to cache 105 via clock interface 110 during the high power mode of operation. For example, the clock signal provided to cache 105 via low power bus interface 120 during the low power mode of operation may be a lower frequency than the clock signal provided via clock interface 110. In accordance with this embodiment of the present invention, because the clock frequency provided to cache 105 is lower during the low power mode of operation, the voltage provided to processor 100 by power supply 175 may be lower during the low power mode of operation. In this manner, the power consumed by processor 100 may be further reduced during the low power mode of operation.

In accordance with one embodiment of the present invention, at step 340 of FIG. 3 a snoop request is sent from the controller to the processor via the low power bus. This snoop request may include the target address of the memory access of the peripheral device. This address may be sent to the processor via data line 153, alone or in addition to one or more other data lines, of low power bus 150. This address may then be sent to cache 105 to determine if data associated with the same address is stored in the cache. In accordance with one embodiment of the present invention, this address may be initially sent to the tag array portion of cache 105, and if a hit is detected in the tag array, the address may be sent to the data array portion of the cache. In accordance with one embodiment of the present invention, this address may multiplexed onto the same address signal lines that couple core 130 to cache 105.

At step 350 of FIG. 3, a snoop response is then sent from cache 105 of processor 100 to controller 155 via low power bus interfaces 120 and 140 and low power bus 150. This response may be sent via data line 153, alone or in addition to one or more other data lines, of low power bus 150.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A computer system, comprising:
a processor comprising a cache, a first bus interface and a second bus interface;
a controller to snoop the cache via the first bus interface during a first mode of operation and to snoop the cache via the second bus interface during a second mode of operation, the second mode of operation being a lower power mode than the first mode of operation, and the first bus interface to be powered down during the second mode of operation, the first bus interface is coupled to the controller via a first bus, the first bus is a parallel bus, and the second bus is a serial bus having a single data line, the first bus being wider than the second bus, the first bus to consume more power during the first mode of operation than the second bus consumes during the second mode of operation; and
a main memory and a peripheral device, the peripheral device to request an access of the main memory via the controller.

2. The computer system of claim 1, further comprising a clock generator, the clock generator to provide a first clock signal to the first bus interface via a clock signal line coupled between the clock generator and the processor, the clock generator to further provide a second clock signal to the second bus interface via a clock signal line coupled between the clock generator and the controller.

3. The computer system of claim 2, wherein the processor further comprises a circuit to provide the first clock signal to the cache during the first mode of operation and to provide the second clock signal to the cache during the second mode of operation.

4. The computer system of claim 3, wherein the processor further comprises a phase-locked loop, and the second clock signal is routed through the phase-locked loop before being provided to the cache during the second mode of operation.

5. The computer system of claim 1, wherein the second bus interface is coupled to the controller via a second bus, and the second bus includes a clock signal line for source-synchronous operation, a control line, and a data line.

6. A computer system, comprising:
a high power bus;
a low power bus that is narrower than the high power bus and includes a clock signal line for source-synchronous operation;
a processor comprising a cache, a high power bus interface coupled to the high power bus and a low power bus interface coupled to the low power bus;
a controller to communicate with the processor via the high power bus during a high power mode of operation and to communicate with the processor via the low power bus during a low power mode of operation, the high power bus is to be powered down during the low power mode of operation, the first bus interface is coupled to the controller via a first bus, the first bus is a parallel bus, and the second bus is a serial bus having a single data line, the controller is to snoop a memory region of the processor via the high power bus during the high power mode of operation, and the controller is to snoop the memory region via the low power bus during the low power mode of operation;
a main memory and a peripheral device, the peripheral device to request an access of the main memory via the controller; and
a power supply to provide a lower voltage supply to the processor during the low power mode of operation than during the high power mode of operation.

7. The computer system of claim 6, further comprising a clock generator, the clock generator to provide a clock signal to the memory region via a first clock signal line coupled between the clock generator and the processor during the high power mode of operation, the clock generator to further provide a clock signal to the memory region via the clock signal line of the low power bus during the low power mode of operation.

8. The computer system of claim 6, wherein a clock signal is to be provided via the clock signal line by the controller.

9. An integrated circuit comprising:
a high power bus interface through which a memory region may be snooped during a high power mode of operation; and
a low power bus interface through which the memory region may be snooped during a low power mode of operation, the high power bus interface is to be powered down during the low power mode of operation, and the high power bus interface supports a first bus, and the low power bus interface supports a second bus that is narrower than the first bus, the low power bus interface provides for source-synchronous operation and the high power bus interface lacks support for source-synchronous operation; and
a memory bus interface.

10. The integrated circuit of claim 9, further comprising a first phase-locked loop (PLL) to provide a clock signal to the memory region during the high power mode of operation, and a second PLL to provide a clock signal to the memory region during the low power mode of operation, the second PLL to receive a clock signal via the low power bus interface.

11. A method of accessing a cache comprising:
snooping a cache via a high power parallel bus during a high power mode of operation;
transitioning to a low power mode of operation, including powering down the high power bus and flushing a cache; and
snooping the cache via a low power serial bus having a single data line during a low power mode of operation, including providing a clock signal to the cache via the low power serial bus.

* * * * *